(12) United States Patent
Hennebert

(10) Patent No.: US 9,397,793 B2
(45) Date of Patent: Jul. 19, 2016

(54) METHOD FOR SECURELY TRANSMITTING PACKETS FOR WIRELESS TELECOMMUNICATIONS SYSTEM

(75) Inventor: Christine Hennebert, La Tronche (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 813 days.

(21) Appl. No.: 13/099,604

(22) Filed: May 3, 2011

(65) Prior Publication Data

US 2011/0274277 A1 Nov. 10, 2011

(30) Foreign Application Priority Data

May 10, 2010 (FR) ...................................... 10 01986

(51) Int. Cl.
| | |
|---|---|
| *H04K 1/00* | (2006.01) |
| *H04L 1/16* | (2006.01) |
| *H04L 9/14* | (2006.01) |
| *H04L 9/30* | (2006.01) |
| *H04L 29/06* | (2006.01) |
| *H04W 12/02* | (2009.01) |
| *H04L 1/18* | (2006.01) |
| *H04W 88/02* | (2009.01) |

(52) U.S. Cl.
CPC ............ *H04L 1/1671* (2013.01); *H04L 1/1819* (2013.01); *H04L 9/14* (2013.01); *H04L 9/3066* (2013.01); *H04L 63/0442* (2013.01); *H04W 12/02* (2013.01); *H04L 1/1816* (2013.01); *H04L 2209/34* (2013.01); *H04L 2209/80* (2013.01); *H04W 88/02* (2013.01)

(58) Field of Classification Search
CPC   H04L 2209/34; H04L 2209/80; H04W 88/02

USPC ................... 380/270, 273; 713/171; 455/450
See application file for complete search history.

(56) References Cited

U.S. PATENT DOCUMENTS

| | | | |
|---|---|---|---|
| 2007/0112972 A1 | 5/2007 | Yonge, III et al. | |
| 2009/0010434 A1* | 1/2009 | Carles | ........................... 380/255 |
| 2009/0249158 A1* | 10/2009 | Noh et al. | ..................... 714/750 |

OTHER PUBLICATIONS

French Preliminary Search Report issued Mar. 7, 2011, in French Patent Application No. FR 1001986.
Xiaojun Tang, et al., "On the Throughput of Secure Hybrid-ARQ Protocols for Gaussian Block-Fading Channels", IEEE Transactions on Information Theory, vol. 55, No. 4, XP-011253818, Apr. 1, 2009, pp. 1575-1591.
U.S. Appl. No. 13/482,306, filed May 29, 2012, Hennebert.

* cited by examiner

*Primary Examiner* — Farid Homayounmehr
*Assistant Examiner* — Suman Debnath
(74) *Attorney, Agent, or Firm* — Oblon, McClelland, Maier & Neustadt, L.L.P.

(57) ABSTRACT

A method for securely transmitting packets on a wireless link is disclosed. This method advantageously uses a type II HARQ protocol. In a first step, a first version of a packet is transmitted, so that the receiver cannot decode it. The receiver generates a couple of public and private keys, and sends back to the transmitter a negative acknowledgment as well as the public key. The transmitter then transmits a second version of the packet, encrypted using the public key. The receiver tries to decode a combination of the first and the second versions of the packet. In case of success, a positive acknowledgment is transmitted to the transmitter and, in case of failure, the retransmission process is iterated.

15 Claims, 8 Drawing Sheets

METHOD FOR SECURELY TRANSMITTING PACKETS FOR WIRELESS TELECOMMUNICATIONS SYSTEM

TECHNICAL FIELD

The present invention relates to the field of wireless telecommunications systems and more particularly that of secured telecommunications systems.

STATE OF THE PRIOR ART

The HARQ (Hybrid Automatic Repeat reQuest) protocol is a well-known retransmission request mechanism for controlling so-called channel fading between a transmitter and a receiver. In particular, this protocol is used in 3GPP systems implementing HSPA (High Speed Packet Access) technology and is contemplated in fourth generation mobile systems, within the framework of LTE (Long Term Evolution) project.

There are currently several versions of HARQ protocol.

The simplest version, called Type I HARQ, combines the advantages of Forward Error Correction (FEC) and those of conventional ARQ protocol by encoding an information data block with an Error Detection Code (EDC) and an Error Correction Code (ECC). If such a number of errors is detected that the ECC code cannot correct, a block retransmission request is sent to the transmitter and a second transmission attempt occurs. In practice, the erroneous block is not removed but is stored in a buffer to be combined (Chase combining) with the block received at the second attempt. The combination result is subjected to the decoder.

A second version of HARQ protocol, called Type II HARQ or IR HARQ (Incremental Redundancy HARQ) enables redundant transmissions to be avoided. According to this version, upon the first block transmission, the code is punctured so that few redundancy symbols are transmitted. If the block received upon the first transmission turns out to be erroneous and cannot be corrected using available redundancy symbols, additional redundancy symbols, removed during puncturing, are transmitted in response to the first transmission request. The process can be repeated, with the redundancy symbols being incrementally transmitted, as retransmission requests proceed, as long as the erroneous block cannot be corrected.

HARQ protocol does not have per se only function for securing transmitted data against a possible interception by a spy receiver. Various encryptions (or ciphering) methods involving a public key or a secret key are known to the state of the art. However, this encryption is generally performed at an applicative level, upstream the HARQ protocol implementation. On the other hand, this protocol, whether of the Type I or II, increases, through consecutive retransmissions, the redundancy of transmitted data and consequently the probability that the key used for decryption can be cracked.

In particular, it has been proposed in the paper of X. Tang et al. entitled "On the throughput of secure hybrid-ARQ protocols for gaussian block-fading channels" published in IEEE Trans. on Information Theory, Vol. 5, No 4, April 2009, pp. 1575-1591, to use a family of Wyner codes for encrypting packets to be transmitted on a link using a Type II HARQ protocol. This family codes has the advantage to be compatible with different puncturing rates, that is with the transmission of redundancy increments.

The abovementioned secured transmission method however assumes that a large quantity of auxiliary information is sent to the receiver to decode the transmitted packets. Moreover, it is relatively complex to be implemented, so that it is ill-suited to "real time" type applications and does not enable low latency constraints to be met. Finally, it only operates in so far as the channel quality between the transmitter and the receiver is better than that between the transmitter and a spy receiver.

Generally, it is the object of the present invention to provide a method for securely transmitting packets on a wireless link between a transmitter and a receiver that does not have the drawbacks of the prior art.

In particular, an object of the present invention is to provide a method for securely transmitting packets using a Type II HARQ protocol, which is simple to be implemented, compatible with "real time" type applications, while exhibiting a very high confidentiality level.

SUMMARY OF THE INVENTION

The present invention is defined by a method for securely transmitting data packets on a wireless link between a transmitter and a receiver, wherein:
the transmitter transmits on said link a first version of a data packet not enabling said packet to be decoded by the decoder;
as a result of the decoding failure of the first version of the packet, the receiver generates a first pair of keys consisting of a first private key and a corresponding first public key and transmits the first public key to the transmitter;
the transmitter transmits on said link a second version of said packet, encrypted by means of a first encryption key, obtained from the first public key;
the receiver decrypts the second version of the packet, combines said first version and second version, to obtain a first combined version of said packet, and performs decoding of the first combined version thus obtained.

According to a first or second embodiment, the first encryption key is said first public key and the receiver decrypts the second version of the packet using said first private key.

Preferably, if decoding of the first combined version fails, then the receiver generates a second pair of keys consisting of a second private key and of a corresponding second public key;
the transmitter transmits on said link a third version of said packet, after encrypting it using the second public key;
the receiver decrypts the third version of the packet using the second private key, combines the third version thus decrypted with at least the first decrypted version or the second decrypted version to obtain a second combined version of said packet, and performs decoding of the second combined version thus obtained.

According to a third or fourth embodiment, the transmitter generates a pair of keys consisting of a private key, called transmitter private key, and a corresponding public key, called transmitter public key, and the transmitter performs a stream encryption, the first encryption key used therefore for encrypting the second version of the packet being obtained as the product of the transmitter private key and the receiver first public key.

In this case, the receiver decrypts the second version of the packet using said first encryption key obtained as the product of the transmitter public key and the receiver first private key.

Advantageously, if decoding of the first combined version fails,
then the receiver generates a second pair of keys consisting of a second private key and a corresponding second public key, and transmits said second public key to the transmitter;

the transmitter transmits on said link a third version of said packet, after encrypting it using a stream encryption with a second encryption key obtained as the product of the transmitter private key and the receiver second public key.

The receiver then decrypts the third version of the packet using said second encryption key obtained as the product of the transmitter public key and the receiver second private key, combines the third version thus decrypted with at least the first or the second decrypted version to obtain a second combined version of said packet, and performs decoding of the second combined version thus obtained.

Advantageously, the first version of the packet is obtained by coding this packet by means of an error correction code, followed by a first puncturing of the packet thus encoded, with a decoding rate exceeding the correcting capabilities of said code.

The second version of the packet may comprise symbols having been removed by the first puncturing of the encoded packet.

The second version of the packet can be obtained by a second puncturing of the encoded packet and the third version of the packet comprises symbols having been punctured out by the first and/or second puncturing(s).

The encryption of the second version of the packet can be carried out after the second puncturing.

Advantageously, coding of the packet is of the systematic type, and the first puncturing removes the systematic symbols of the encoded packet.

Preferably, the transmission method implements a type II HARQ protocol.

Preferably, the first and second private keys are generated from a same germ.

This germ typically undergoes a processing by a non-invertible function, the germ thus processed being used as a private key, the corresponding public key being obtained from the private key by means of, for example, an algorithm making use of the elliptic curve properties.

BRIEF DESCRIPTION OF THE DRAWINGS

Other characteristics and advantages of the invention will appear in view of a preferred embodiment of the invention described with reference to the appended figures in which.

DETAILED DESCRIPTION OF PARTICULAR EMBODIMENTS

In the following, a wireless telecommunications system and more particularly, a wireless link between a transmitter and a receiver using a packet transmission will be considered.

The transmitter can be a mobile terminal and the receiver a base station (uplink). Alternatively, the transmitter can be a base station and the receiver a mobile terminal (downlink).

It will also be assumed that transmitted packets are coded beforehand using an Error Correcting Code ECC and, if need be, a Cyclic Redundancy Check (CRC).

Packets thus coded are then encrypted by means of a symmetric (with a secret key) or asymmetric (with a public key) encryption algorithm as detailed below.

In any case, the receiver can determine whether a received packet is correct or erroneous.

Figure 1:
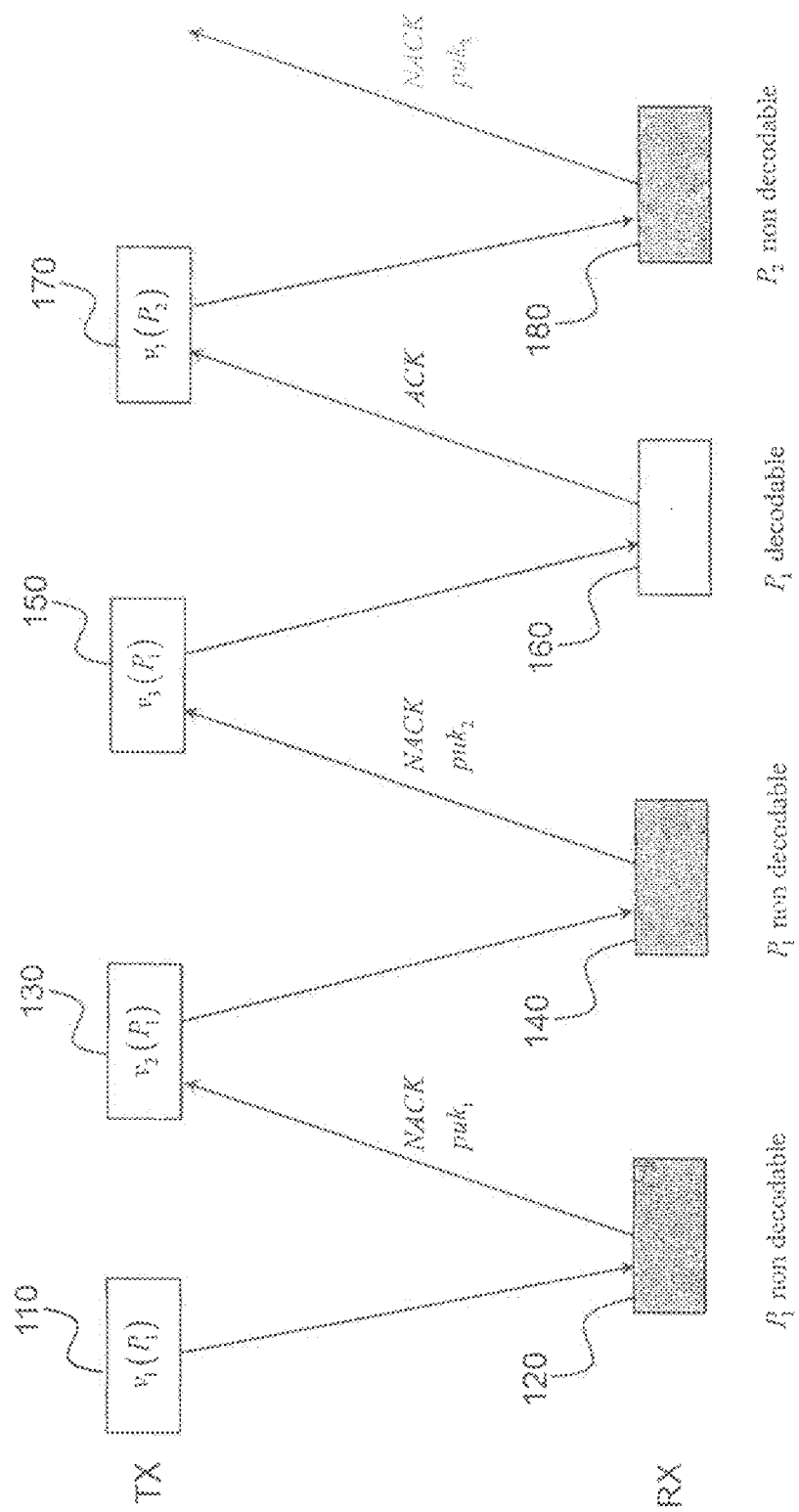
FIG. 1 schematically illustrates a method for securely transmitting packets, according to a first embodiment of the invention.

The transmission method according to a first embodiment of the invention implements a plurality of consecutive transmissions of a packet as illustrated in FIG. 1.

More precisely, in a first step 110, the transmitter transmits a first version of this packet, $v_1(P_1)$, with the feature that the receiver cannot decode it. By version of a packet, it is intended a subset of symbols of this packet. For example, if the packet consists of a sequence of symbols, a punctured packet, that is a packet from which some symbols of the sequence have been removed, will be considered as a version of this packet.

Typically, the first version of the packet, not decodable by the receiver, is obtained by an Error Correction Coding followed by puncturing of the encoded packet, with a puncturing rate exceeding the correcting capabilities of the code.

Thus, for example, if a packet is coded with a Reed-Solomon code (n,k), the packet coded and then punctured so that $s>n-k$ symbols are deleted, will be a non decodable version of the packet concerned.

According to another example, if a packet is coded using a turbocoder consisting of the parallel concatenation of several systematic recursive coders, the packet thus coded in which the systematic part will have been fully punctured out will be a non decodable version of this packet.

Of course, other examples of non decodable version of the packet can be contemplated without necessarily departing from the scope of the present invention.

In step 120, the receiver performs decoding of the first version of the packet. This decoding unavoidably fails since this first version does not enable all the information symbols contained in the packet to be reconstituted. However, the receiver can store this first version in a receiving buffer to run it subsequently as detailed below. The decoding failures are represented in grey tone, the successes in light colour.

It will be understood that a spy receiver that would intercept this first version could not be able to decode the packet. In order to ensure a high confidentiality level, a high puncturing rate will be advantageously used at the transmitter.

As a result of the decoding failure, the receiver sends back a negative acknowledgment, NACK, coded on one bit.

The receiver also generates a first pair of keys $(prk_1, puk_1)$ consisting of a first private key, $prk_1$, and a corresponding first public key, $puk_1$, an asymmetric encryption algorithm known per se, for example, an algorithm making use of the properties of elliptic curves. The first public key, $puk_1$, is sent to the transmitter with the negative acknowledgment, NACK.

Upon receiving the NACK signal, the transmitter transmits, in step 130, a second version of the packet, $v_2(P_1)$, after encrypting it using the first public key, $puk_1$.

The second version of the packet is obtained through a second puncturing of the packet. It advantageously consists of symbols removed by the first puncturing step. Further, this second version can also include some symbols already present in the first version of the packet.

In step 140, the receiver receives the second version of the packet encrypted by the first public key, $puk_1$, and decrypts it using the first private key, $prk_1$.

It then combines the first and second versions of the packet to obtain a first combined version of this packet.

When the second version only consists of symbols removed by the first puncturing step, the combination consists of inserting the symbols of the second version instead of the removed symbols. It is then strictly speaking a packet depuncturing. When some symbols of the second version were already present in the first version, the combination is of the Chase type (Chase Combining), that is the combination can then be a sum of soft values of symbols present in both versions. Generally, it will be understood that the combination could include both a depuncturing step (insertion or concatenation of removed symbols) and a step of adding soft values for the symbols present in both versions.

The receiver then performs a second decoding attempt of the first combined version.

In case of success, that is in the absence of error, the receiver sends back a positive acknowledgment, ACK, to the transmitter. The transmitter is then ready to transmit a new packet.

In case of a new failure, the preceding process is iterated, as illustrated in FIG. 1, that is a second pair of keys is generated, consisting of a second private key, $prk_2$, and a corresponding second public key, $puk_2$. The receiver sends back a negative acknowledgment, NACK, to the transmitter, as well as the second public key, $puk_2$.

Upon receiving the signal, NACK, the transmitter transmits in 150 a third version of the packet $v_3(P_1)$, obtained by means of a third packet puncturing. The third version advantageously consists of symbols removed by the first and/or second puncturing steps. Finally, this third version, like the preceding one, is not transmitted as such, but is encrypted beforehand, this time by means of the second public key, $puk_2$.

The receiver decrypts in 160 this third version, combines the version thus decrypted to the first and/or second version(s) stored to obtain a second combined version, and performs decoding of the second combined version. It will be noted that such combining is performed according to the same principle as above.

The retransmission process proceeds until the transmitter receives a positive acknowledgment, ACK, or a maximum allowed number of consecutive versions of the same packet has been transmitted, or even all the symbols of the packet have already been transmitted.

It will be understood that changing the encryption key at each transmission of a new version of the packet ensures a very high confidentiality level on the link.

According to an alternative, a new encryption key can be generated only every $Q \geq 2$ decoding failures. In other words, the receiver which does not succeed in decoding the packet only creates a new pair of public and private keys once every Q.

As soon as the transmitter receives an acknowledgment, ACK, it can transmit the following packet, present in the emitting buffer. This operating mode of HARQ protocol is known as stop-and-wait. In other words, the transmitter waits to be sure that the current packet is actually received before transmitting the following one.

Alternatively, the present invention can use the Go-Back-N ARQ mode or the selective repeat ARQ mode, in a known manner per se. It will be remembered that in these operating modes, the transmitter does not wait for an acknowledgment of a packet to transmit the following one.

More precisely, in the Go-Back-N ARQ mode, the transmitter uses a sliding time window having a size of N packets. The size N defines the number of packets the transmitter can transmit without receiving an acknowledgment, ACK. If the transmitter did not receive an acknowledgment after N packets, it resumes the transmission from the packet for which it has not received an acknowledgment, ACK.

The "selective repeat ARQ" mode differs from the preceding one in that the receiver transmits a positive acknowledgment, ACK, for each properly decoded packet, even after receiving an erroneous packet. If the transmitter receives a NACK signal, it retransmits the erroneous packet on the fly and then resumes its transmission where it has stopped it.

In a further alternative, the present invention can use an "N-Stop-and-Wait" mode in a known manner per se. It will be remembered that such a mode enables the latency of the "Stop-and-Wait" mode to be advantageously used, between the transmission of a packet and the reception of its acknowledgment, by sending new packets in this time interval. Each packet is processed independently of the other.

An important point is that the "Go-Back-N ARQ", "selective repeat ARQ" and "N-Stop-and-Wait" modes can be used in combination with the first embodiment of the invention. For the sake of brevity and without generalisation prejudice, only the selective repeat ARQ mode will be described hereinafter.

Figure 2:
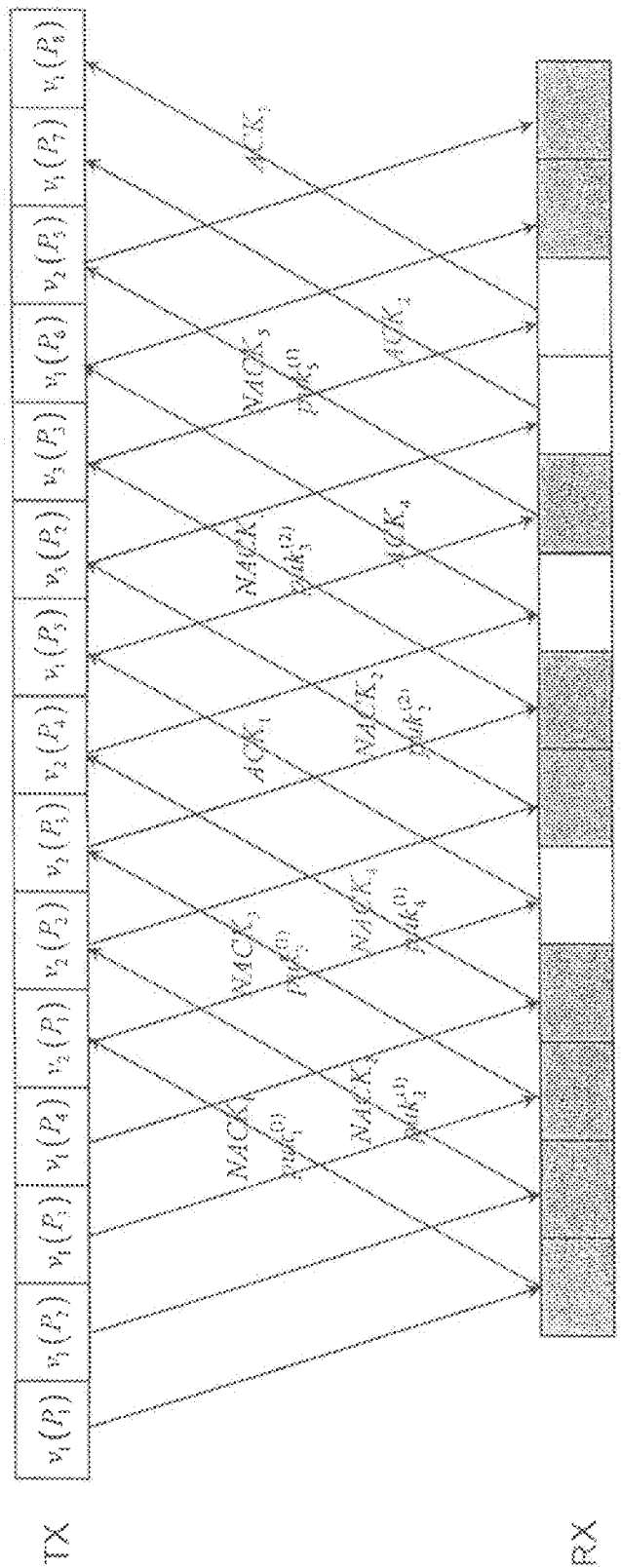
FIG. 2 schematically illustrates a method for securely transmitting packets, according to a second embodiment of the invention.

FIG. 2 represents a method for securely transmitting packets according to a second embodiment of the invention. More precisely, this embodiment uses a selective repeat ARQ retransmission protocol, taking N=4 by way of example.

It is noted that, in a first step, the transmitter transmits first versions of packets, $v_1(P_1), v_1(P_2), v_1(P_3), v_1(P_4)$ without waiting for corresponding acknowledgments. Since the first versions $v_1(P_1), v_1(P_2), v_1(P_3), v_1(P_4)$ are not decodable, the receiver sends back the negative acknowledgments $NACK_1, \ldots, NACK_4$ to the transmitter as well as the public keys $puk_1^{(1)}, puk_2^{(1)}, puk_3^{(1)}, puk_4^{(1)}$.

The transmitter then resumes the transmission at the beginning of the time window with the transmission of the second versions $v_2(P_1), v_2(P_2), v_2(P_3), v_2(P_4)$, coded using the public keys $puk_1^{(1)}, puk_2^{(1)}, puk_3^{(1)}, puk_4^{(1)}$, respectively, without waiting for the corresponding acknowledgments. The receiver decodes the second versions of the packets using the corresponding private keys $prk_1^{(1)}, prk_2^{(1)}, prk_3^{(1)}, prk_4^{(1)}$.

For all four packets, the receiver combines the first and second versions and attempts a new decoding of the combination obtained. In the illustrated case, the decoding fails for packets $P_2$ and $P_3$, and is successful for packets $P_1$ and $P_4$. The receiver consequently sends back $ACK_1$, $NACK_2$ with the new public key $puk_2^{(2)}$, $NACK_3$ with the new public key $puk_3^{(2)}$, and $ACK_4$.

When the transmitter receives a positive acknowledgment, it moves on to a new packet and transmits a first version thereof. Thus, after $ACK_1$, the transmitter transmits packet $P_5$ and after $ACK_4$, it transmits packet $P_6$.

Conversely, when the transmitter receives a negative acknowledgment, it transmits on the fly a new version of the corresponding packet. Thus, after $NACK_2$, the transmitter transmits a third version, $v_3(P_2)$ of packet $P_2$, encrypted using key $puk_2^{(2)}$. Moreover, after $NACK_3$, the transmitter transmits a third version of the packet, $v_3(P_3)$, encrypted with key $puk_3^{(2)}$.

In the illustrated example, a new couple of public and private keys is generated at each decoding failure of a packet. However, this generation can only occur after Q consecutive failures. For example, it could be assumed that Q=N=4. In this case, it will be noted that the second versions of the packets are encrypted with the same public key. The number Q of failures between two key generations can still result from a random number computer selection.

The generation of the couple of private and public keys at the receiver uses a germ which can advantageously be reset upon each powering on and/or each setting of a new communication. For example, the germ can be obtained using an XOR operation between the PIN code of the user and the start up/setting time of communication, expressed according to a given format. This germ can further undergo a processing by a non-invertible function so as to prevent a spy from going back to the latter from a mere observation of the keys generated. For example, this treatment can consist of a complex arithmetic operation followed by a modulo with respect to a prime number. Of course, other examples can be contemplated without necessarily departing from the scope of the present invention.

The result of this processing serves as a private key for the receiver. The corresponding public key is generated in a known manner per se, for example using the RSA algorithm, or an elliptic curve cryptography algorithm, having the advantage to produce shorter keys.

Figure 3:
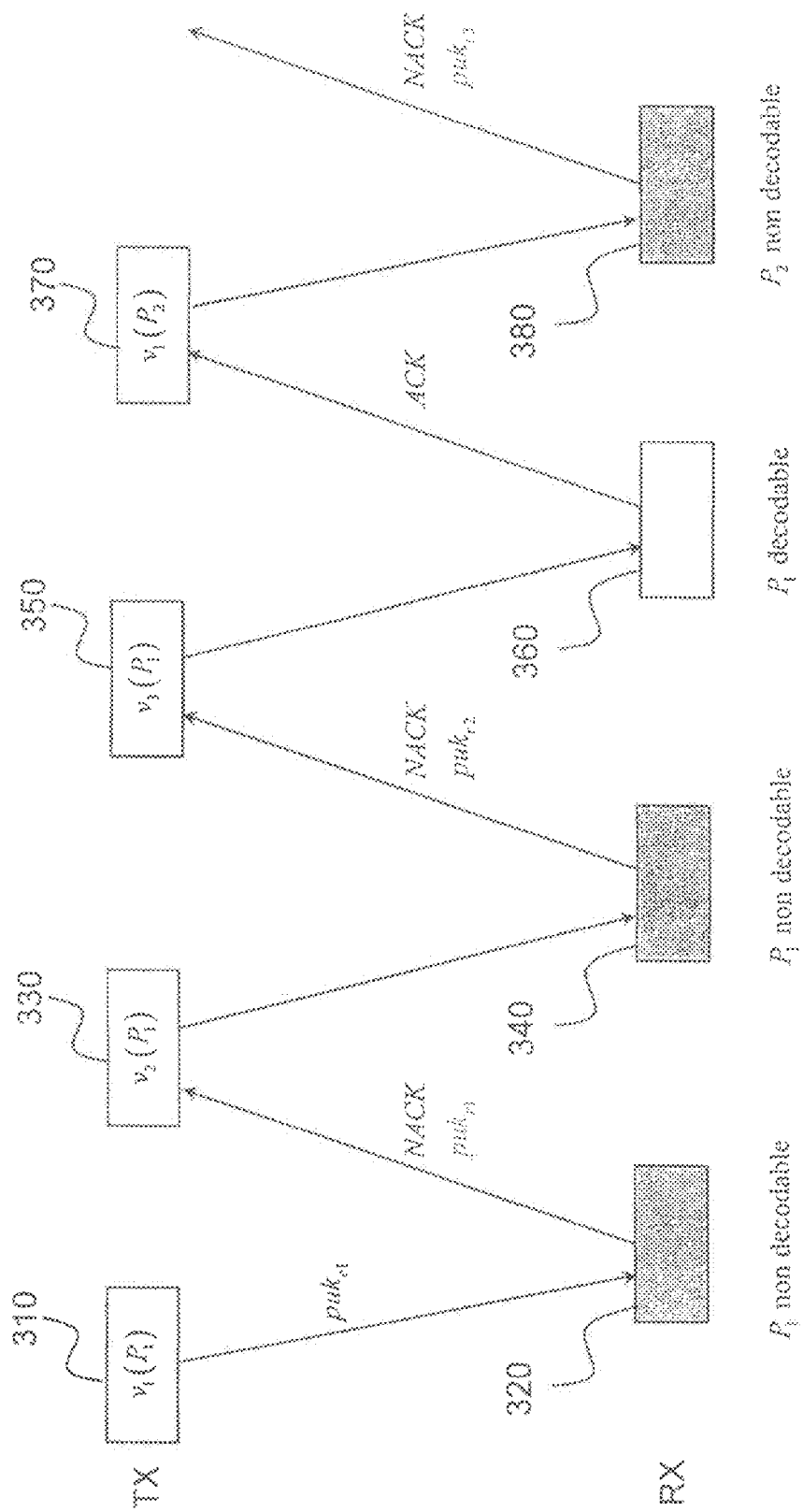
FIG. 3 schematically illustrates a method for securely transmitting packets, according to a third embodiment of the invention.

FIG. 3 schematically illustrates a method for securely transmitting packets, according to a third embodiment of the invention. This embodiment differs from the first one in that a stream encryption algorithm is used instead of an asymmetric encryption algorithm.

It will be remembered that a stream encryption is a particular type of symmetric encryption, in other words of an encryption using a secret key shared between the transmitter and the receiver (Bob and Alice). More precisely, a stream encryption generally performs a combination (for example by means of an exclusive OR: XOR) between an encryption pseudo-random binary stream and the bits of the message to be encrypted. The pseudo-random binary stream is generated using the secret key for example by setting using this key the content of a linear feedback shift register. Among the stream encryption algorithm, the RC4 algorithm or Py algorithm could in particular be used.

The secret key, also called session key, is advantageously generated using a pair of asymmetric keys of the transmitter and a pair of asymmetric keys $(puk_r, prk_r)$ of the receiver. To do this, the transmitter generates a pair of asymmetric keys $(puk_e, prk_e)$ and transmits the public key $puk_e$ of this pair to the receiver. Conversely, the receiver also generates a pair of asymmetric keys $(puk_r, prk_r)$ and transmits the public key of this pair to the transmitter. Each one of the transmitter and the receiver can then generate the secret key $K_s$ from the property:

$$K_s = puk_e \cdot prk_r = puk_r \cdot prk_e$$

the product $puk_r \cdot prk_e$ being calculated by the transmitter and the product $puk_e \cdot prk_r$ being calculated by the receiver.

Turning back to FIG. 3, the transmitter transmits in 310 a first non decodable version of packet $P_1$, $v_1(P_1)$, obtained through puncturing as in the first embodiment.

However, unlike the first embodiment, the transmitter transmits, with this new version, the public key $puk_e$ of a pair of asymmetric keys $(puk_e, prk_e)$ it has generated beforehand for this session. According to an alternative not represented, the public key $puk_e$ has been transmitted to the receiver in a previous step, for example during the transmission initialization.

In step 320, the receiver determines that the first version of the packet is non decodable and sends back a negative acknowledgment, NACK, as well as the public key $puk_{r1}$ of a first pair of asymmetric keys it has generated beforehand for this session.

The receiver calculates in 320 the secret session key with $K_{s1} = puk_e \cdot prk_{r1}$.

Upon receiving the signal NACK, the transmitter transmits in step 320, a second version of the packet, $v_2(P_1)$, after encrypting it using the session secret key. To do this, the transmitter calculates this key beforehand with $K_{s1} = prk_e \cdot puk_{r1}$.

The second version of the packet is obtained through a second puncturing of the packet. It advantageously consists of symbols removed by the first puncturing step. Further, this second version can also include some symbols already present in the first version of the packet.

The second version of the packet thus encrypted is decrypted by the receiver by means of the secret session key in 340.

It then combines the first and second versions of the packet to obtain a first combined version of this packet.

The different alternatives contemplated for the first embodiment (depuncturing with or without combining of the Chase Combining type) are also applicable herein.

The receiver then performs a second decoding attempt of the version thus combined.

In case of success, that is in the absence of error, the receiver sends back to the transmitter a positive acknowledgment, ACK. The transmitter is then ready to transmit a new packet.

In case of a new failure, the preceding process is iterated, as illustrated in 340, in other words a new pair of asymmetric keys is generated by the receiver, consisting of a second private key, $prk_{r2}$, and a corresponding second public key, $puk_{r2}$. The receiver sends back to the transmitter a negative acknowledgment, NACK, as well as the second public key, $puk_{r2}$. It also calculates in 340 a second secret session key with $K_{s2} = puk_e \cdot prk_{r2}$.

Upon receiving the signal NACK, the transmitter transmits in 350 a third version of the packet, $v_3(P_1)$, after encrypting it using the second secret session key, $K_{s2}$. This third version advantageously consists of symbols removed by the first and/or second puncturing steps.

Moreover, the second session key would have been calculated beforehand by the transmitter with $K_{s2} = prk_e \cdot puk_{r2}$.

The receiver decrypts in 360 this third version using the second secret session key $K_{s2}$, and combines this third version thus decrypted with the first and/or second version(s) stored to obtain a second combined version, according to the same principle as above. The receiver then performs decoding of the second combined version.

The retransmission process proceeds until the transmitter receives a positive acknowledgment, ACK, or a maximum allowed number of consecutive versions of the same packet has been transmitted, or even all the symbols of the packet have already been transmitted.

Changing the session key at each transmission of a new version ensures a very high confidentiality level on the link.

Moreover, stream encryption has the advantage not to disturb much the channel decoding. The possible transmission errors on the encrypted message appear without amplification, that is without substantial increase in their number, with respect to the unencrypted message.

As above, it is important to note that the "Go-Back-N ARQ", "selective repeat ARQ" and "N-Stop-and-Wait" modes can be used in combination with the third embodiment of the invention. For the sake of brevity but without generalisation prejudice, only the selective repeat ARQ mode will be described hereinafter.

Figure 4:
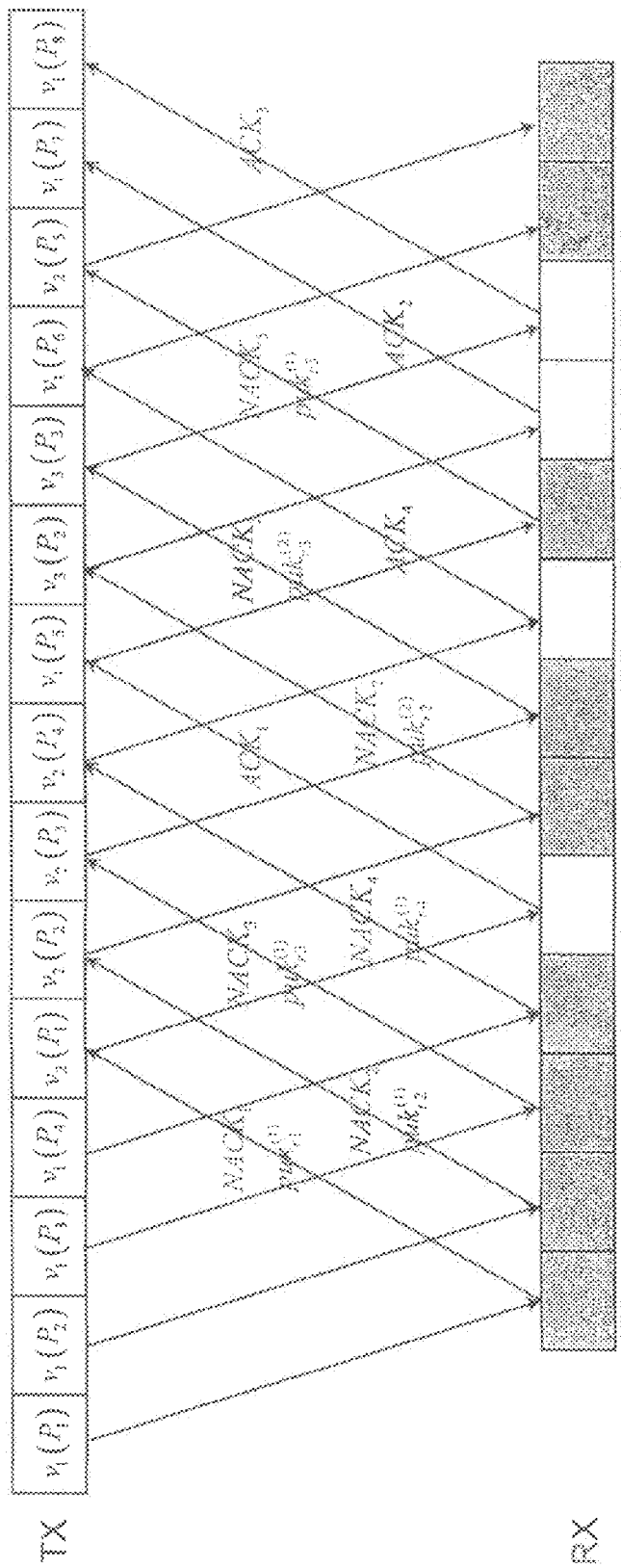
FIG. 4 schematically illustrates a method for securely transmitting packets, according to a fourth embodiment of the invention.

FIG. 4 schematically illustrates a method for securely transmitting packets, according to a fourth embodiment of the invention.

This embodiment uses a selective repeat ARQ retransmission mode as in the second embodiment and a stream encryption as in the third embodiment.

It is assumed that in a previous step, for example upon initializing transmission, or long before the transmission of the sequence of the N=4 packets, the transmitter generated a pair of asymmetric keys $(puk_e, prk_e)$ and transmitted to the receiver the public key $puk_e$ of this pair. Alternatively, this public key can be transmitted by concatenating it with the first versions of the packets $v_1(P_1), v_1(P_2), v_1(P_3), v_1(P_4)$.

As in the second embodiment, the transmitter transmits first versions of packets, $v_1(P_1), v_1(P_2), v_1(P_3), v_1(P_4)$ without waiting for the corresponding acknowledgments. Since the first versions $v_1(P_1), v_1(P_2), v_1(P_3), v_1(P_4)$ are not decodable, the receiver sends back the negative acknowledgments $NACK_1, \ldots, NACK_4$ to the transmitter as well as the public keys $puk_{r1}^{(1)}, puk_{r2}^{(1)}, puk_{r3}^{(1)}, puk_{r4}^{(1)}$. It also calculates the secret session keys with $K_{s1}^{(1)} = prk_{ri}^{(1)} \cdot puk_e$, $i=1, \ldots, 4$.

The transmitter then calculates these same secret session keys with $K_{s1}^{(1)} = prk_{ri}^{(1)} \cdot puk_e$, $i=1, \ldots, 4$. The transmitter then resumes the transmission at the beginning of the time window with the transmission of the second versions $v_2(P_1), v_2(P_2), v_2(P_3), v_2(P_4)$, coded using the secret keys $K_{s1}^{(1)}, K_{s2}^{(1)}, K_{s3}^{(1)}, K_{s4}^{(1)}$, respectively, without waiting for the corresponding acknowledgments.

The receiver decodes the second versions of the packets using the secret keys $K_{s1}^{(1)}, K_{s2}^{(1)}, K_{s3}^{(1)}, K_{s4}^{(1)}$, already calculated. For all four packets, the receiver then combines the first and second versions and attempts a new decoding of the combination obtained. In the illustrated case, decoding fails for packets $P_2$ and $P_3$, and is successful for packets $P_1$ and $P_4$. The receiver consequently sends back $ACK_1$, $NACK_2$ with the new public key $puk_{r2}^{(2)}$, $NACK_3$ with the new public key $puk_{r3}^{(2)}$), and $ACK_4$.

The transmitter then calculates the new secret session keys $K_{s2}^{(2)} = puk_{r2}^{(2)} \cdot prk_e$ and $K_{s3}^{(2)} = puk_{r3}^{(2)} \cdot prk_e$.

Generally, when the transmitter receives a positive acknowledgment, it moves on to a new packet and transmits a first version thereof. Thus, after $ACK_1$, the transmitter transmits packet $P_5$ and after $ACK_4$, it transmits packet $P_6$.

Conversely, when the transmitter receives a negative acknowledgment, it transmits on the fly a new version of the corresponding packet. Thus, after $NACK_2$, the transmitter transmits a third version $v_3(P_2)$ of packet $P_2$, encrypted using key $K_{s2}^{(2)}$. Moreover, after $NACK_3$, the transmitter transmits a third version of the packet, $v_3(P_3)$, encrypted with key $K_{s3}^{(2)}$.

In the example illustrated in FIG. 4, the receiver generates a new couple of asymmetric keys at each decoding failure of a packet, to obtain a new secret session key which will be used for the encryption of the new version.

However, this generation can only occur after Q consecutive failures. For example, it could be assumed that Q=N=4.

In this case, it will be noted that the second versions of the packets are encrypted with the same secret session key. The number Q of failures between two key generations can still result from a random number computer selection.

Finally, the transmitter can regularly or randomly update the couple of asymmetric keys $(puk_e, prk_e)$. At each updating, the new public key $puk_e$ is transmitted to the receiver.

The generation of couples of asymmetric keys at the transmitter and/or receiver could be made with a germ as explained above. Advantageously, the transmitter and the receiver will use different germs.

Figure 5:
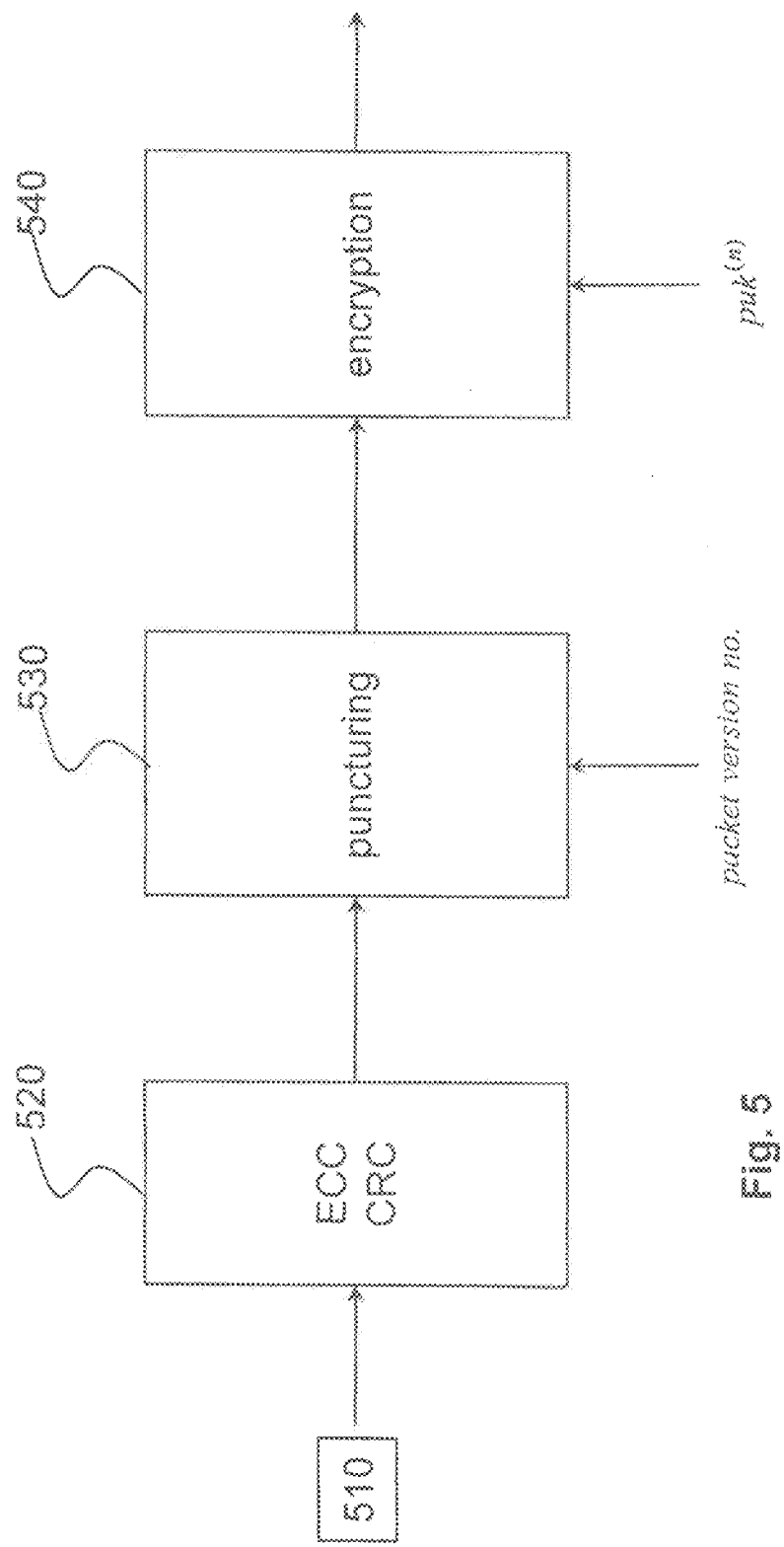
FIG. 5 schematically illustrates the structure of a transmitter for implementing the method for securely transmitting packets according to the first or second embodiment of the invention.

FIG. 5 schematically shows the structure of a transmitter for implementing the secured transmission method according to the first or second embodiment of the invention to be implemented.

The transmitter comprises a coder 510 coding the packets 500 using an error correction code and, if need be, an Error Detection Code. The error correction coder can perform a block coding, for example a Reed-Solomon type or BCH coding, a convolutive coding, a parallel or serial turbocoding, or even a LDPC (Low Density Parity Check code) coding.

The puncturer 520 punctures the packet thus coded with different possible puncturing rates. The puncturing rate is a function of the version number of the packet required by the receiver. As seen above, the first version is punctured with a high puncturing rate not enabling the decoding at the receiver. For example, if the coder 510 uses a systematic coding, the first puncturing will be able to remove all the systematic symbols. For the following versions of the packet, two alternatives can be contemplated.

According to a first alternative, the puncturer 520 only provides, for the following versions of a packet (that is for the first, second, etc. retransmission), symbols that have been removed during a previous puncturing. For example, if the coder 510 uses a systematic coding, the puncturer will be able to provide in the consecutive versions of the packet, the systematic symbols, and then the redundancy symbols removed during the first puncturing step. The advantage of this alternative is to transmit only new symbols at each new retransmission.

According to a second alternative, the puncturer 520 provides for the second, third, etc. version of a packet, symbols removed during a previous puncturing but also symbols which were present in a previous version of this packet. The advantage of this alternative is to allow a combining of the Chase combining type, and therefore a quicker decoding of the packet in case of a low signal to noise ratio.

The packet version provided by the puncturer is then encrypted using a public key, herein noted $puk^{(n)}$. This is transmitted beforehand by the receiver.

Figure 6:
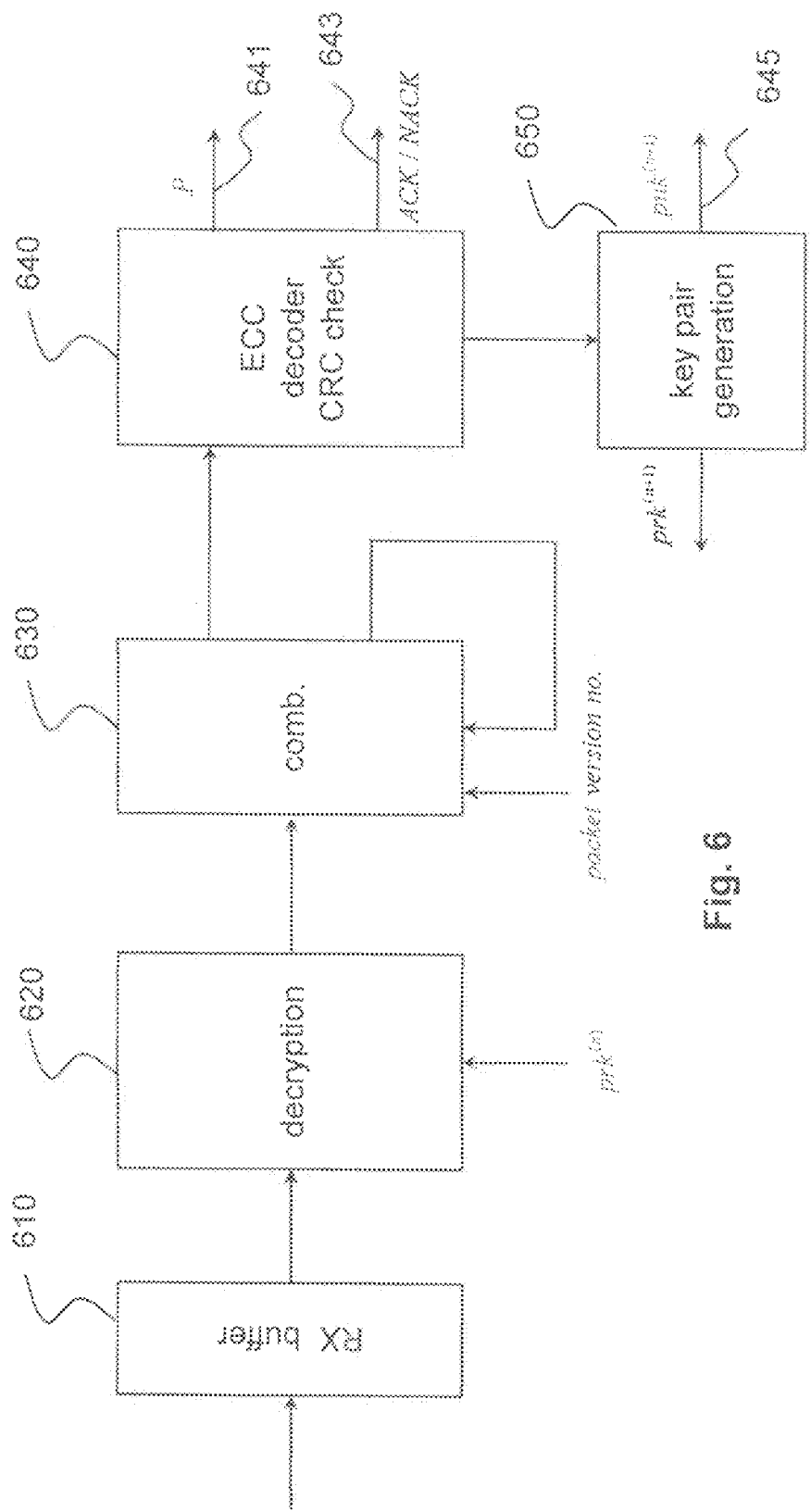
FIG. 6 schematically illustrates the structure of a receiver for implementing the method for securely transmitting packets according to the first or second embodiment of the invention.

FIG. 6 schematically shows the structure of a receiver for implementing the secured transmission method according to the first or second embodiment of the invention.

The receiver comprises a receiving buffer 610, in which are stored the incoming packets. The packets are decrypted by the decryption module 620, using the private key $prk^{(n)}$ associated to the public key $puk^{(n)}$.

The packet version thus decrypted is then processed by module 630. This module performs a combination of several available versions of a same packet to provide a combined version in a combining buffer (not shown). Module 630 substitutes the received symbols for the erasures, as they are provided by the consecutives versions of a same packet (depuncturing). If need be, it sums for example the soft values of a same symbol, when it is present in different versions of the packet. Module 630 receives a piece of information for a version number of the packet (either transmitted in the version header, or obtained by incrementing a counter) and from that, infers the erasures to be substituted and/or the soft values of the symbols to be summed up.

The summing and the puncturing functions can be run by entities of this module, whether distinct or not. The summing function will not be implemented if each new version contains new symbols, absent from the preceding versions, in other words if each new version is a redundancy increment. Generally, it will be understood that the combination comprises a depuncturing step (for the symbols received from a new version then completing the symbols already available in the combining buffer) and, if need be, an adding step (the soft values of symbols of a new version being respectively added to those of symbols already present in the combining buffer). At the end of this operation, the combining buffer contains a combined version of the packet.

The combined version of the packet is then decoded using decoder 640. This decoder indicates whether or not the packet is decodable. If it is decodable, it provides in 641 the decoded packet, P, and transmits in 443, to the transmitter, a positive acknowledgment, ACK. In the opposite case, it transmits in 643 a negative acknowledgment, NACK, and commands module 650 to generate a new pair of public and private keys, noted $(puk^{(n+1)}, prk^{(n+1)})$. The private key is stored at the receiver and the public key is transmitted to the transmitter in 645. Preferably, the private key is deleted as soon as the version(s) of the packet, encrypted using the corresponding public key, is (are) received and decrypted.

Finally, it has been seen that for the "Go-Back-N ARQ", "selective repeat ARQ" and "N-Stop-and-Wait" modes, N packets are consecutively received and can be processed independently the one from the other, in a serial and/or parallel mode. In this case, it can be provided several processing lines, for example N processing lines such as that shown in FIG. 6, optionally sharing some common modules, at the expense of multiplexing at the input and/or output of these modules.

Figure 7:
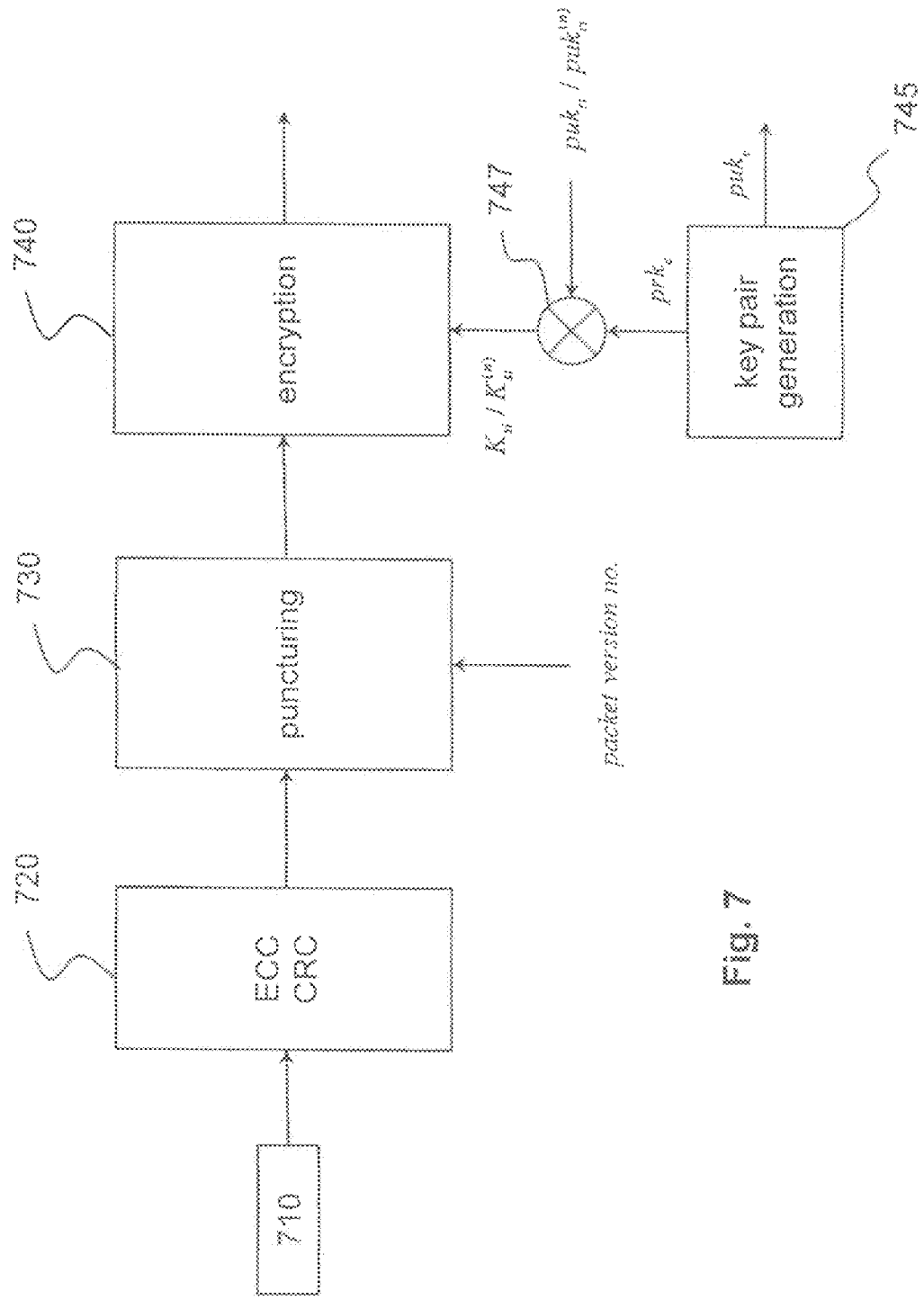
FIG. 7 schematically illustrates the structure of a transmitter for implementing the method for securely transmitting packets according to the third or fourth embodiment of the invention.

FIG. 7 schematically shows the structure of a transmitter for implementing the secured transmission method according to the third or fourth embodiment of the invention.

Modules 710 to 740 are identical to modules 510 to 540 of FIG. 5, respectively. However, unlike this figure, the transmitter comprises a generator of a couple of asymmetrical keys $(puk_e, prk_e)$, 745. The public key, $puk_e$, is transmitted to the receiver either independently or, for example, by concatenating it to a first version of the packet. The generation of the keys in 745 is made at a substantially slower rate than at the receiver, for example at each setting. The secret session key ($K_{s1}$ for the third embodiment, $K_{s1}^{(n)}$ for the fourth embodiment) is obtained by multiplying in 747 the private key of the transmitter $prk_e$ with the public key received from the receiver ($puk_{ri}$, or $puk_{ri}^{(n)}$ depending on the embodiment).

Figure 8:
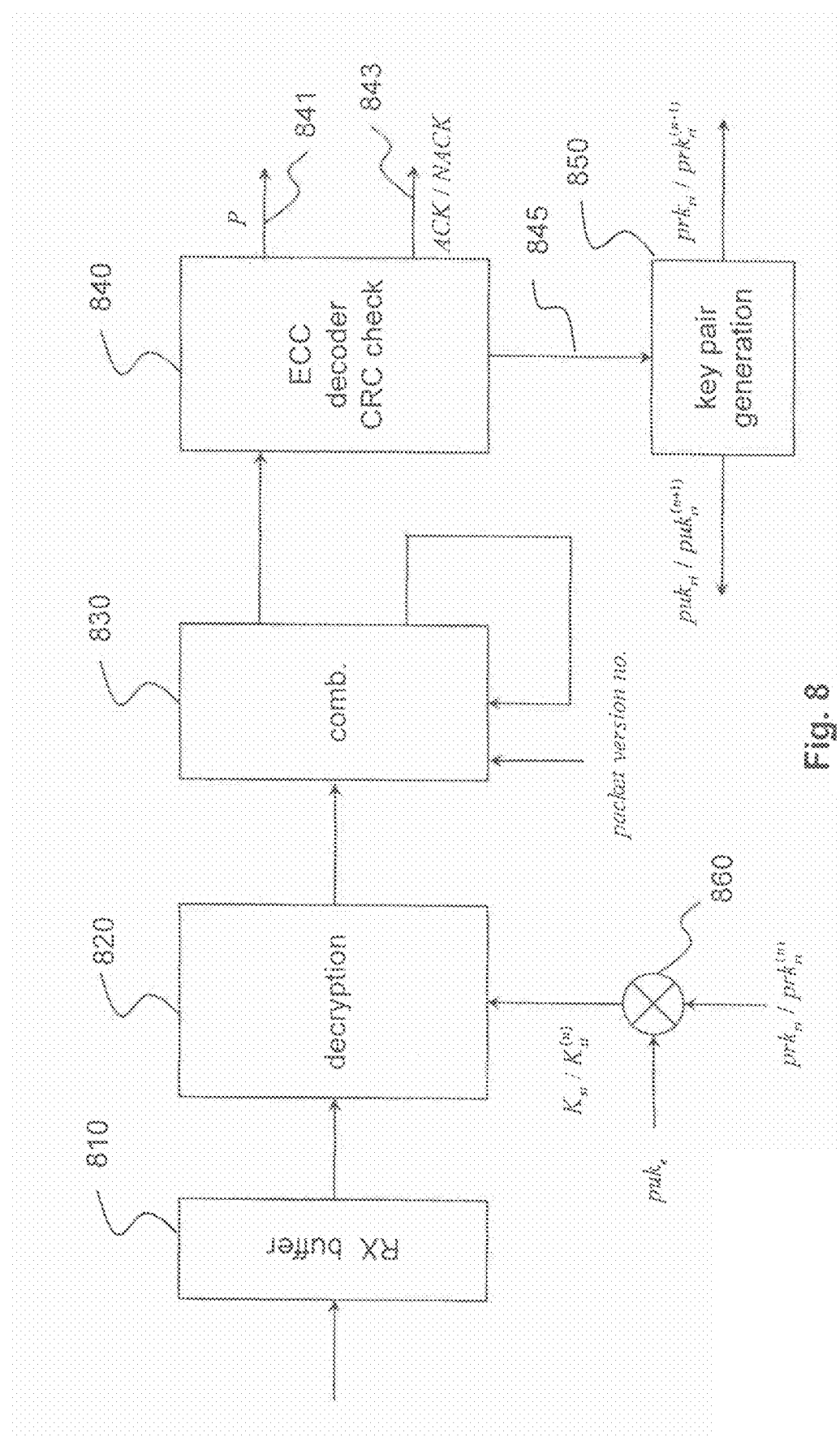
FIG. 8 schematically illustrates the structure of a receiver for implementing the method for securely transmitting packets according to the third or fourth embodiment of the invention.

FIG. 8 schematically shows the structure of a receiver for implementing the secured transmission method according to the third or fourth embodiment of the invention.

Modules 810 to 840 are identical to modules 610 to 640 of FIG. 6, respectively. Unlike this figure, however, the receiver calculates herein the secret session key ($K_{s1}$ for the third embodiment, $K_{s1}^{(n)}$ for the fourth embodiment) used for decryption, by multiplying in 860 the public key $puk_e$ received from the transmitter with the private key locally generated ($prk_{ri}$ or $prk_{ri}^{(n)}$ depending on the embodiment).

A new pair of asymmetric keys is automatically generated in 850 each time a packet is not decodable (and a negative acknowledgment is sent) or after Q consecutive failures only.

The invention claimed is:

1. A method for securely transmitting data packets on a wireless link between a transmitter and a receiver, wherein:
    the transmitter encodes a data packet with an error correcting code, punctures the thus encoded data packet to obtain a first version of the data packet, transmits said first version of the data packet on the wireless link, the puncturing being chosen such that it exceeds correcting capabilities of the error correcting code, whereby the first version of the data packet cannot be decoded by the receiver;
    as a result of a decoding failure of the first version of the data packet, the receiver generates a first pair of keys consisting of a first private key and a corresponding first public key and transmits the first public key to the transmitter;
    the transmitter transmits on said wireless link a second version of said data packet, encrypted by means of a first encryption key, obtained from the first public key; and
    the receiver decrypts the second version of the data packet, combines said first version and second version, to obtain a first combined version of said data packet, and performs decoding of the first combined version thus obtained.

2. The transmission method according to claim 1, wherein the first encryption key is said first public key and the receiver decrypts the second version of the data packet using said first private key.

3. The transmission method according to claim 2, wherein, if decoding of the first combined version fails,
    then the receiver generates a second pair of keys consisting of a second private key and of a corresponding second public key;
    the transmitter transmits on said wireless link a third version of said data packet, after encrypting it using the second public key; and
    the receiver decrypts the third version of the data packet using the second private key, combines the third version thus decrypted with at least the first decrypted version or the second decrypted version to obtain a second combined version of said data packet, and performs decoding of the second combined version thus obtained.

4. The transmission method according to claim 1, wherein the transmitter generates a pair of keys consisting of a private key, called transmitter private key, and a corresponding public key, called transmitter public key, in that the transmitter performs a stream encryption and in that the first encryption key used therefore for encrypting the second version of the data packet is obtained as the product of the transmitter private key and the receiver first public key.

5. The transmission method according to claim 4, wherein the receiver decrypts the second version of the data packet using said first encryption key obtained as the product of the transmitter public key and the receiver first private key.

6. The transmission method according to claim 5, wherein if decoding of the first combined version fails,
    then the receiver generates a second pair of keys consisting of a second private key and a corresponding second public key, and transmits said second public key to the transmitter; and
    the transmitter transmits on said wireless link a third version of said data packet, after encrypting it using a stream encryption with a second encryption key obtained as the product of the transmitter private key and the receiver second public key.

7. The transmission method according to claim 6, wherein the receiver decrypts the third version of the data packet using said second encryption key obtained as the product of the transmitter public key and the receiver second private key, combines the third version thus decrypted with at least the first or the second decrypted version to obtain a second combined version of said data packet, and performs decoding of the second combined version thus obtained.

8. The transmission method according to one of the preceding claims, wherein the first version of the data packet is obtained by coding this data packet by means of an error correction code, followed by a first puncturing of the packet thus encoded, with a puncturing rate exceeding the correcting capabilities of said code.

9. The transmission method according to claim 8, wherein the second version of the data packet comprises symbols having been removed by the first puncturing of the encoded packet.

10. The transmission method according to claim 9, wherein the second version of the data packet is obtained by a second puncturing of the encoded packet and in that the third version of the packet comprises symbols having been punctured out by the first and/or second puncturing(s).

11. The transmission method according to claim 10, wherein encryption of the second version of the data packet is performed after the second puncturing.

12. The transmission method according to claim 8, wherein coding of the data packet is of the systematic type, and in that the first puncturing removes the systematic symbols of the encoded packet.

13. The transmission method according to claim 12, wherein the method implements a type II HARQ (Hybrid Automatic ReQuest) protocol.

14. The transmission method according to claim 3 or 6, wherein the first and second private keys are generated from a same germ.

15. The transmission method according to claim 14, wherein the germ undergoes a processing through a non-invertible function, the germ thus processed being used as a private key, the corresponding public key being obtained from the private key by means of an elliptic curve cryptography algorithm.

* * * * *